United States Patent Office 3,564,562
Patented Feb. 16, 1971

3,564,562
PREPARATION OF DIFLUOROCYANA-
MIDE, PERFLUOROGUANIDINE AND
PERFLUOROFORMAMIDINE
Simon Frank and Marion Douglas Meyers, Stamford, Conn., assignors to American Cyanamid Company, Stamford, Conn., a corporation of Maine
No Drawing. Filed May 11, 1962, Ser. No. 195,023
Int. Cl. C01c 3/16
U.S. Cl. 23—359          11 Claims This invention relates broadly to the preparation of a fluorinated compound and, more particularly, to a new and useful method of preparing difluorocyanamide (1,1-difluorocyanamide), $F_2N-C\equiv N$.

Difluorocyanamide is a surprisingly stable compound. It is useful, for example, as an intermediate in the synthesis of other chemical compounds. For instance, it can be used as an intermediate in producing difluorodiazirine as disclosed and claimed in the copending application of one of us (Marion Douglas Meyers), Ser. No. 195,022, filed May 11, 1962, now U.S. Pat. No. 3,257,381. The properties of difluorocyanamide are tabulated below:

Molecular weight (by gas density): Calcd., 78. Found, 82±5.

Boiling point: $-66\pm3°$ C. by extrapolation from vapor pressure measurements.

$F^{19}$ nuclear magnetic resonance spectrum: One broad peak with triplet character at $\phi=-70.9$ p.p.m.[1]

Infrared spectrum—

| Absorption, $\mu$: | Assignment |
| --- | --- |
| 4.48 weak | $C\equiv N$. |
| 7.85 weak | C—F impurity (?). |
| 9.72 (triplet) strong | Predominantly symmetric $NF_2$. |
| 11.18 (doublet) strong | Predominantly asymmetric $NF_2$. |
| 11.83 (triplet) medium | Predominantly C—N. |
| Mass spectrum | Shows strong 78 peak. |

Reacts slowly with Hg.

[1] G. Filipovich and G.V.D. Tiers, J. Phys. Chem., 63, 761 (1959).

The present invention is based on our discovery that 1,1-difluorocyanamide (hereafter for brevity often referred to as "DFC") can be readily and economically produced by the fluorination of biguanide using the so-called "fluid-bed" technique hereafter more fully described. Other products of the reaction ordinarily include, in addition to DFC, perfluoroformamidine, (I)

(hereafter for brevity often referred to as "PFF") and perfluoroguanidine, (II)
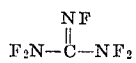

(hereafter for brevity often referred to as "PFG").

The apparatus used in practicing the present invention comprises means for passing (preferably upwardly passing) gaseous fluorine ($F_2$) through a mass or bed of biguanide in finely divided (particulate) state, e.g., from 80 to 200-mesh (U.S. Standard sieve series) fineness. Preferably the biguanide is admixed with a finely divided solid diluent or additive which dilutes the biguanide reactant and/or serve to catalyze the reaction. Examples of suitable solid diluents or additives for this purpose are the alkali-metal (sodium, potassium, lithium, cesium and rubidium) fluorides. Such alkali-metal fluorides are preferred as diluents because they combine with HF that is formed during the reaction. Other examples of operative diluents include $CaF_2$; $MgF_2$; $BaF_2$; $SrF_2$; $SeF_3$; $Al_2O_3$; $Na_3AlF_6$; and $Na_2SiF_6$. (When such finely divided solid diluents are used, that is, diluents other than an alkali-metal fluoride, an absorber of HF is generally suitably placed, e.g., near the exit end of the reactor, to absorb the HF that is formed in the course of the reaction.) The solid particulate diluent or diluents to the biguanide reactant are generally of approximately the same particle size as the finely divided biguanide, e.g., from 80 to 200-mesh fineness.

The fluorination of the biguanide to obtain fluorination products including DFC, PFF and PFG is more easily controlled by diluting the fluorine gas with an inert carrier gas. Any suitable inert carrier gas can be used, for example, helium, argon, nitrogen, neon, etc. The concentration of the gaseous fluorine in the diluent gas can be varied as desired or as conditions may require, for example, from 1:40% by volume of the gaseous fluorine to 99:60% by volume of the diluent gas. Good results have been obtained when the concentration of the gaseous fluorine in the diluent gas, specifically helium, constituted from about 2% to 20% by volume of the mixed gases.

Any suitable form of reactor and auxiliary components can be used in practicing the method of this invention. For example, the reactor conveniently may be in the form of a U having extended legs with the base of the U and portions of each of the legs supported in a receptacle provided with means for controlling the temperature.

The gaseous fluorine, preferably admixed with a diluent carrier gas, is introduced into the upper part of one of the aforementioned extended legs of the U of the reactor, this leg preferably being narrower in diameter, at least in the portion constituting the reaction zone, than the other leg. This other leg (reaction leg) is fitted with a porous support, e.g., a fine screen of Monel metal or other suitable material, at a suitable position in the said leg. The position of this porous support conveniently may be, for example, near the base of the U and at a point before the diameter of the leg increases to form the reaction zone. An outlet line leads off from the side of the upper part of the reaction leg to carry off the reaction products. A closure-means for the upper end of the reaction leg is provided with a thermocouple well so that temperature-recordings can be made of the temperature of the reaction mass.

The finely divided biguanide, preferably admixed with a finely divided diluent or additive, is introduced into the aforementioned reaction leg where it is supported by the aforesaid porous support. The proportions of biguanide and additive can be varied as desired or as conditions may require. Usually, however, the additive is employed in an amount corresponding to, by weight, from about 50% to about 95% of the total amount of additive and biguanide.

The temperature of the reaction can be varied over a wide range, e.g., from about $-15°$ C. up to a little below the melting point (130° C.) of biguanide or below the point at which sticking or slight fusion of the particles of biguanide, with the resulting formation of larger aggregates, may occur. For instance, the maximum reaction temperature may be about 120° C. Good results have been obtained when the reaction was carried out at a temperature within the range of from about $-15°$ C. to about $+110°$ C.

The reaction products are drawn off from the reaction zone, together with unreacted gaseous fluorine and diluent carrier gas, if used, through the aforementioned outlet

3 line leading from the reaction leg. The reaction products including 1,1-difluorocyanamide are collected by any suitable means, for instance in a series of traps maintained at appropriate temperatures. DFC, PFF and PFG are isolated, as separate components, from the collected reaction products by suitable techniques, e.g., by co-distillation in known manner.

It will be understood, of course, by those skilled in the art that the foregoing description of apparatus that can be used in practicing the present invention is typical of apparatus employed in small-scale, e.g., laboratory-scale, operations. For larger scale or commercial operations, fluid-bed reactors of the general design and arrangement employed, for instance, in the arts of petroleum refining and petrochemicals, suitably modified where necessary, can be used.

In order that those skilled in the art may better understand how the present invention can be carried into effect, the following examples are given by way of illustration and not by way of limitation. All percentages are by weight unless otherwise stated.

EXAMPLE 1

Five (5) g. of biguanide (admixed with 26.8 g. of NaF) is fluorinated with gaseous fluorine (4% by volume $F_2$ and 96% by volume of He as an inert, carrier gas) in a fluid-bed reactor at a temperature of 70° C. for 4 hours. The reactor and arrangement of parts are essentially the same as described hereinbefore. The total product collected in −196° C. traps is stored as a gas in 9 bulbs, each about 450 ml. in volume. DFC is isolated from the crude product fractions by fractional co-distillation technique [Anal. Chem., 31, 618 (1959)]. DFC is then passed through the fractional co-distillation apparatus a second time to yield a total of 7 mmoles of purified DFC from the fluorination reaction described above.

EXAMPLE 2

Same as in Example 1 with the exception that, instead of using helium as the inert carrier gas, gaseous argon is employed. Similar results are obtained.

The following table shows the reaction conditions and results of a series of runs using the general fluorination and isolation techniques employed in Example 1. The percentages given in this table are by volume.

4

TABLE II

Molecular weight, by gas density: Calcd., 116. Found, 116±4
Boiling point: −30±3 °C. by extrapolation from log $P_{mm}=8.63-1370/T$
Oxidizing power: Found, 31 meq. $I^-$/gram $F^{19}$ nuclear magnetic resonance spectrum

| $\phi$, in p.p.m. | Appearance | Area ratio | Assignment |
|---|---|---|---|
| −42.3 | *s, broad | 2 | **$F_2NC\diagup^{NF}_{\diagdown}$ |
| 22.2 | m, broad | 1 | $C=N\diagdown_F$ |
| 84.2 | s, sharp quartet $J_{NF/CF}=11\pm2$ c.p.s. | 1 | $=CF-$ |

* s=strong; m=medium.
** Indicates group considered.

The properties of a typical sample of perfluoroguanidine (PFG) produced as described in the examples of Table I are given in Table III.

TABLE III

Molecular weight, by gas density: Calcd., 149. Found, 141±5.
Boiling point: −2±2° C. by extrapolation from log $P_{mm}=8.07-1,410/T$ $F^{19}$ nuclear magnetic resonance spectrum

| $\phi$, in p.p.m. | Appearance | Area ratio | Assignment |
|---|---|---|---|
| −47.2 | m, broad** | 2 | *$F_2NC\diagup^{NF}$ |
| −42.3 | do | 2 | *$F_2NC\diagup^{NF}$ |
| −20.5 | w, broad | 1 | $C=N\diagdown_F$ |

*Indicates group considered.
**m=medium; w=weak.

We claim:
1. The method of preparing fluorinated compounds which comprises contacting finely divided biguanide with gaseous fluorine admixed with an inert carrier gas; and collecting the reaction products including 1,1-difluorocyanamide.

2. A method as in claim 1 wherein the finely divided biguanide is at a temperature within the range of from about −15° C. up to a temperature below the fusion point of the said biguanide.

TABLE I

| | Bed composition | | Fluorination conditions | | Products | | | | |
|---|---|---|---|---|---|---|---|---|---|
| | BIG, grams | NaF, grams | Time, hours | Approximate temperature, °C. | Total volatile, mmoles | PFF, percent | PFG, percent | DFC, percent | Higher boilers [1] percent |
| Example: | | | | | | | | | |
| 3 | 2.5 | 25 | 3.5 | 5 | 18 | 28 | 16 | 6 | 19 |
| 4 | 2.5 | 26 | 2 | −15 | 6 | 8 | 13 | 8 | 59 |
| 5 | 2.5 | 26 | 3 | 40 | 29 | 5 | 7 | 10 | 12 |
| 6 | 2.5 | 25 | 2 | 2 | 22 | 27 | 18 | 8 | |
| 7 | 0.5 | 5 | 1 | 85 | 11 | 22 | 14 | 27 | <5 |
| 8 | 2.5 | 23 | 2.5 | 60 | 21 | 17 | 14 | 22 | <5 |
| 9 | 4.0 | 34 | 3 | 6 | 52 | 26 | 20 | 6 | 19 |
| 10 | 5.0 | 27 | 4 | 70 | 71 | 18 | 11 | 22 | <5 |
| 11 | 3.4 | 20.5 | 3.0 | 110 | [2] 22 | 2 | 0 | 26 | 0 |

[1] Non-volatile at −78° C.
[2] The total volatiles also included about 40% by volume of fluoroaminotrifluoromethane, $HFN-CF_3$.
Explanatory Notes.—BIG=Biguanide; PFF=Perfluoroformamidine; PFG=Perfluoroguanidine; DFC=1,1-Difluorocyanamide.

EXAMPLE 12

Same as in Example 7 (Table I) with the exception that, instead of 5 g. of NaF, there is used 5 g. of KF. Similar results are obtained.

EXAMPLE 13

Same as in Example 10 (Table I) with the exception that, instead of 27 g. of NaF, there is used 27 g. of CsF. Similar results are obtained.

The properties of a typical sample of perfluoroformamidine (PFF) produced as described in the examples of Table I are given in Table II.

3. The method of preparing fluorinated compounds which comprises contacting a fluid bed comprising finely divided biguanide with a mixture of gaseous fluorine and an inert carrier gas, said fluid bed being at a temperature within the range of from −15° C. to +120° C.; collecting the products of the reaction; and isolating; 1,1-difluorocyanamide from the reaction products.

4. A method as in claim 3 wherein the inert carrier gas is gaseous helium.

5. The method of preparing fluorinated compounds which comprises contacting a fluid bed comprising finely divided biguanide with a mixture of gaseous fluorine and an inert carrier gas, said fluid bed being at a temperature within the range of from −15° C. to +120° C.; collecting the products of the reaction; and isolating, as separate components, perfluoroformamidine and 1,1-difluorocyanamide from the reaction products.

6. The method of preparing fluorinated compounds which comprises contacting a fluid bed comprising finely divided biguanide with a mixture of gaseous fluorine and an inert carrier gas, said fluid bed being at a temperature within the range of from −15° C. to +120° C.; collecting the products of the reaction; and isolating, as separate components, perfluoroformamidine, perfluoroguanidine and 1,1-difluorocyanamide from the reaction products.

7. The method of preparing fluoroinated compounds which comprises contacting a fluid bed comprising finely divided biguanide and finely divided solid diluent for said biguanide with a mixture of gaseous fluorine and an inert carrier gas, said fluid bed being at a temperature within the range of from −15° C. to +110° C.; collecting the products of the reatcion; and isolating 1,1-difluorocyanamide from the reaction products.

8. A method as in claim 7 wherein the finely divided solid diluent is finely divided alkali-metal fluoride.

9. A method as in claim 8 wherein the finely alkali-metal fluoride is finely divided sodium fluoride.

10. A method as in claim 7 wherein the inert carrier gas is gaseous helium.

11. A method as in claim 7 wherein the finely divided solid diluent is finely divided sodium fluoride and the inert carrier gas is gaseous helium.

References Cited

UNITED STATES PATENTS 3,222,123   12/1965   Weichman et al. _____ 23—359

LELAND A. SEBASTIAN, Primary Examiner

U.S. Cl. X.R.

23—190; 260—564